United States Patent [19]

Sindelar

[11] Patent Number: 4,487,594
[45] Date of Patent: Dec. 11, 1984

[54] HOMOKINETIC UNIVERSAL JOINT

[76] Inventor: William F. Sindelar, 8009 York Rd., Towson, Md. 21204

[21] Appl. No.: 509,042

[22] Filed: Jun. 29, 1983

[51] Int. Cl.³ .......................... F16D 3/22; F16D 3/26
[52] U.S. Cl. .................................. 464/123; 464/136; 464/905
[58] Field of Search ............... 464/112, 120, 122, 123, 464/124, 125, 127, 904, 905, 136

[56] References Cited

U.S. PATENT DOCUMENTS

| | | | |
|---|---|---|---|
| 2,670,614 | 3/1954 | Wildhaber | 464/124 |
| 2,672,739 | 3/1954 | Wildhaber | 464/136 |
| 2,672,740 | 3/1954 | Dunn | 464/136 |
| 2,685,784 | 8/1954 | Wildhaber | 464/123 X |
| 2,760,359 | 8/1956 | Wildhaber | 464/120 X |
| 3,041,858 | 7/1962 | Wildhaber | 464/123 |
| 3,975,922 | 8/1976 | Orain | 464/123 |

Primary Examiner—Stuart S. Levy
Assistant Examiner—Thomas R. Hannon

[57] ABSTRACT

One half of a Pot-type universal joint consists of four spherical rollers rotatably mounted, but axially fixed on four mutually perpendicular radial trunnions. Each roller rolls in a grooved member connected to the other joint half. The four grooved members are free to move relative to each other and to their supporting joint half, but only in a way that satifies the kinematic requirements set forth in the specification, while providing a torsionally rigid connection between the two joint halves. The transmission of torque is homokinetic. The joint is adaptable for either axially fixed or axially displaceable requirements.

14 Claims, 19 Drawing Figures

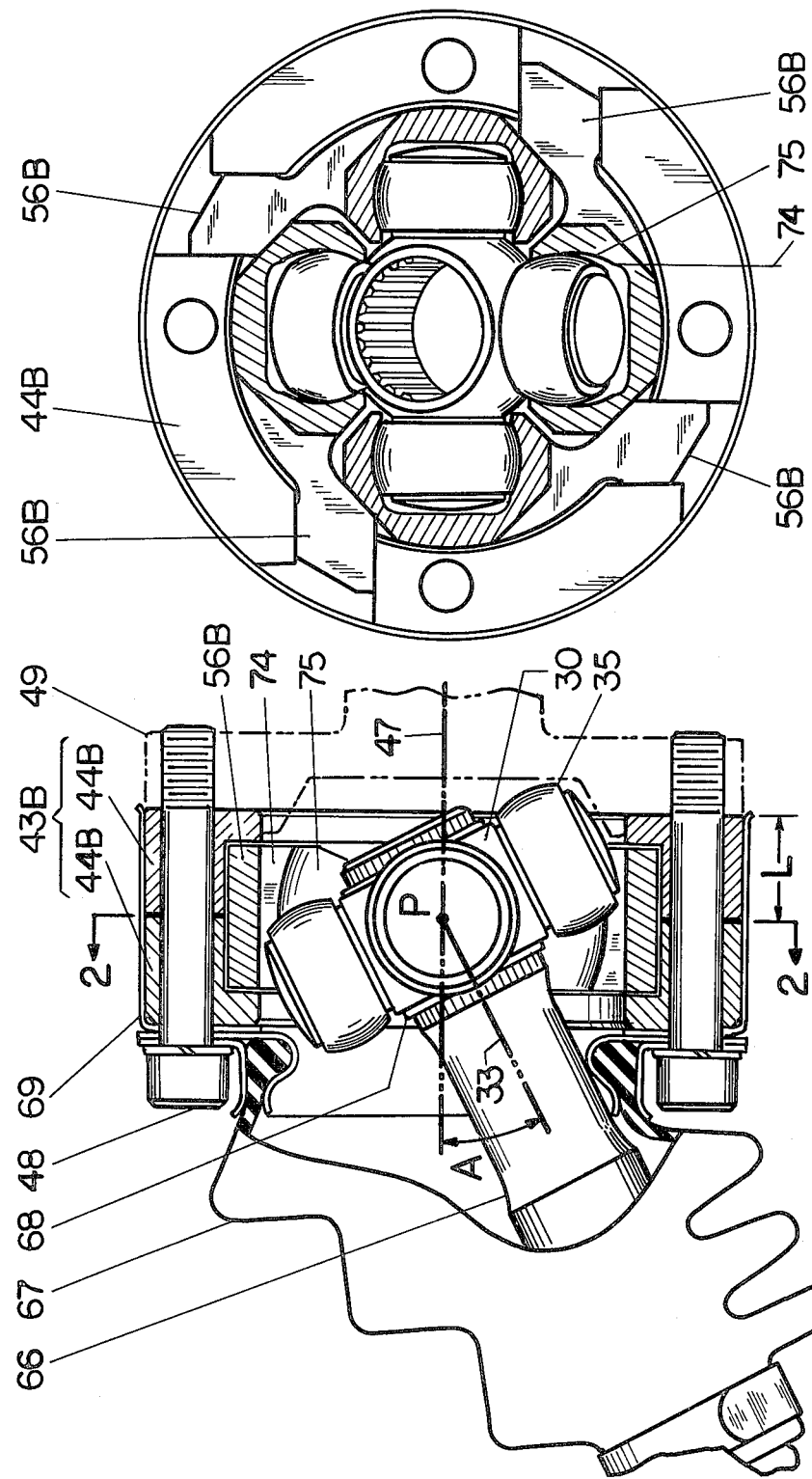

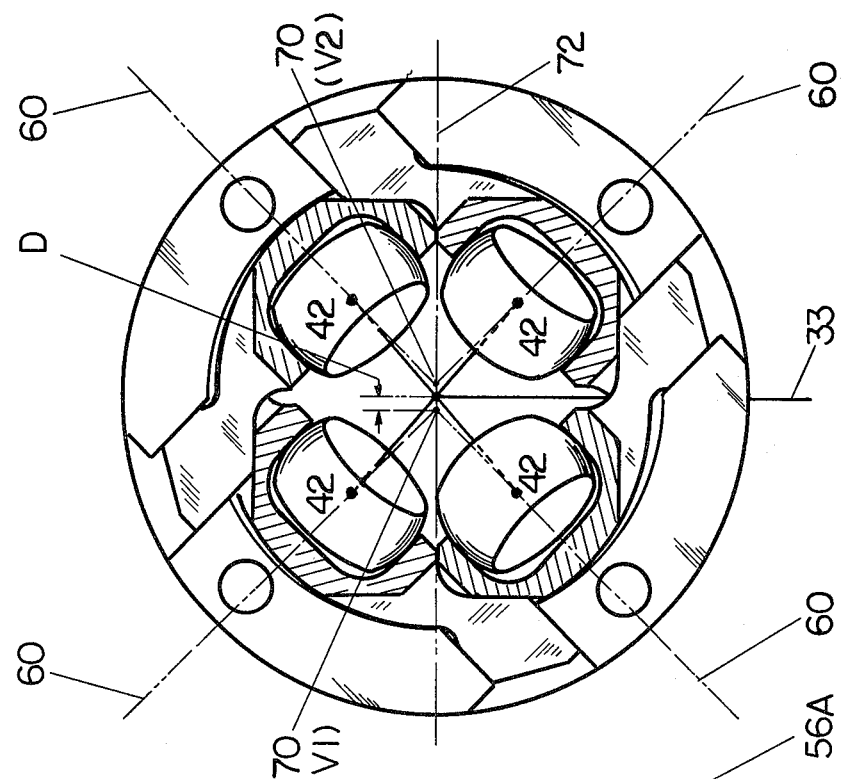
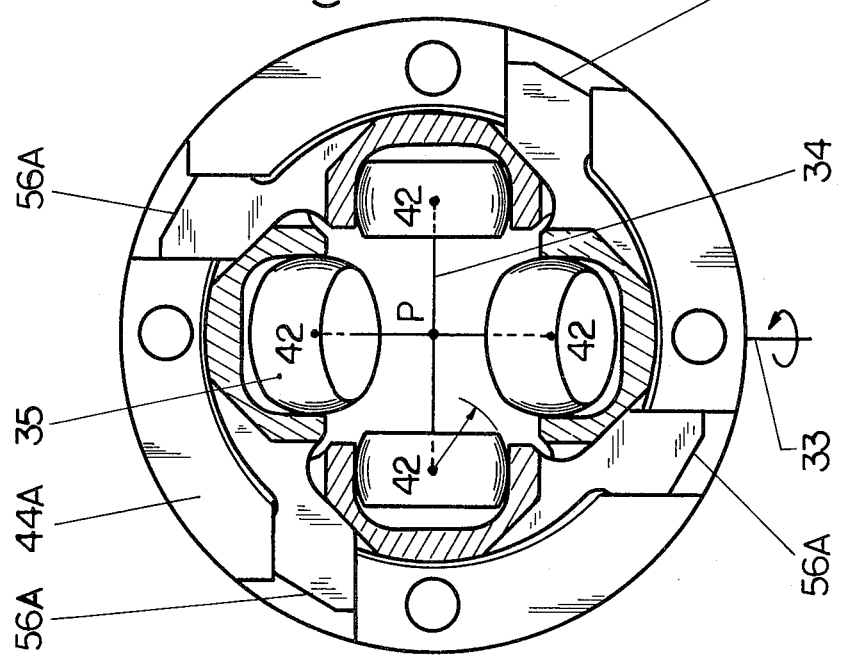
FIG.7
FIG.6

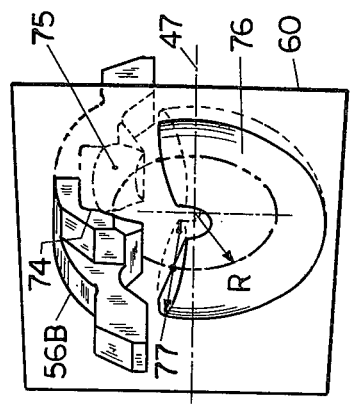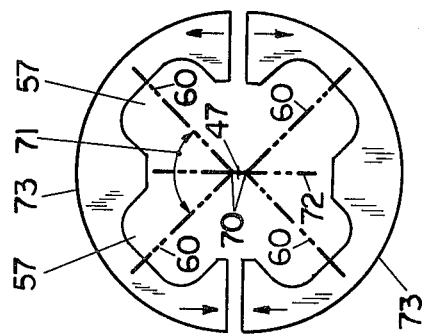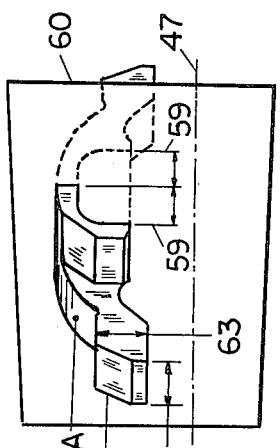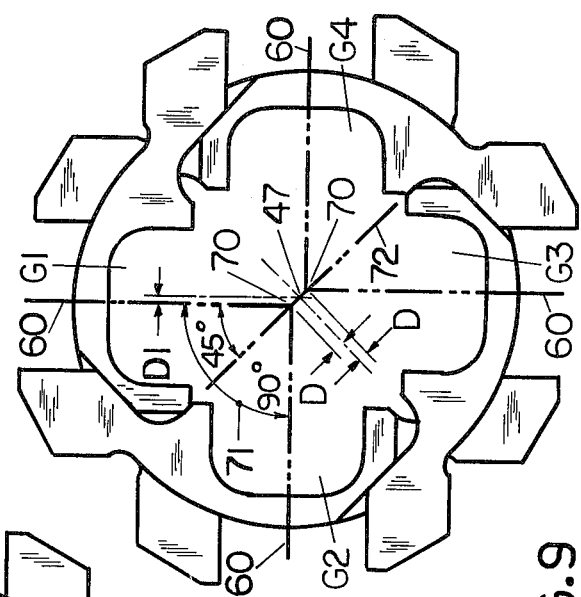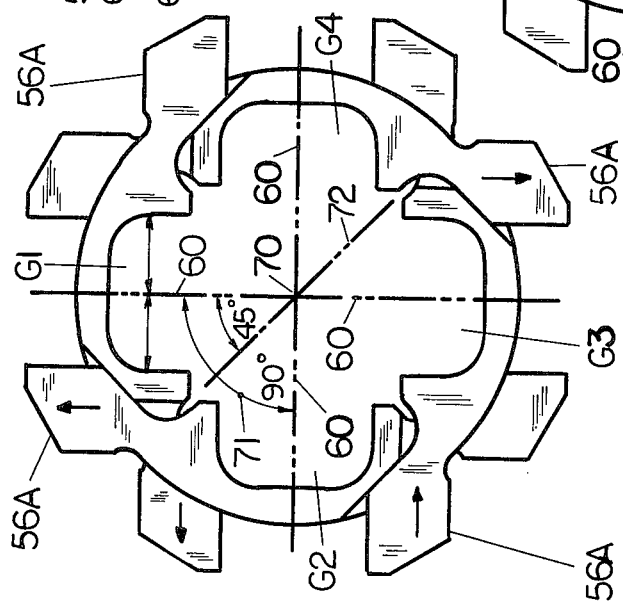

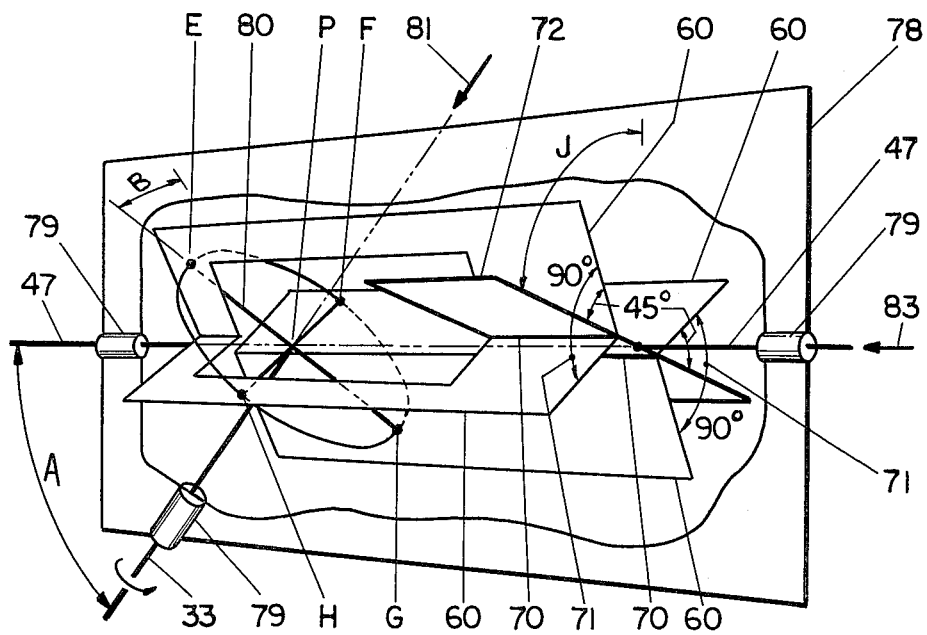
FIG. 13
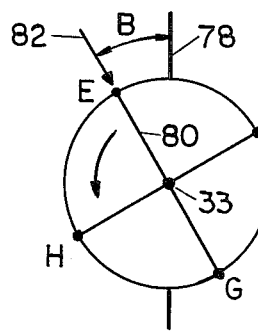
FIG. 14
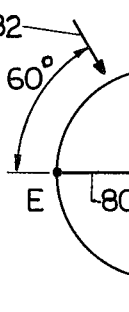
FIG. 15
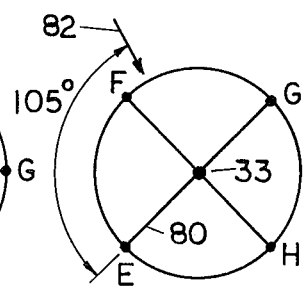
FIG. 16
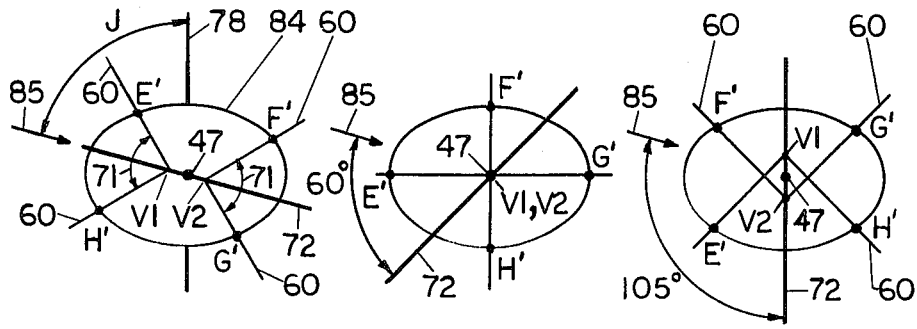
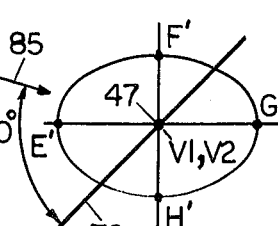
FIG. 17
FIG. 18
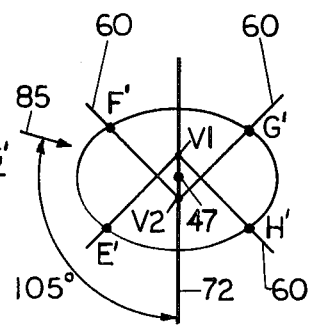
FIG. 19

HOMOKINETIC UNIVERSAL JOINT

TECHNICAL FIELD

This invention is in the general field of shaft couplings. Specifically, it pertains to homokinetic universal joints such as those classified according to function in U.S. Patent Class 464-905.

BACKGROUND ART

Universal joints that transmit torque from one shaft to another by way of rollers rotating on trunnions that are fixed radially to one shaft, while simultaneously rolling inside of grooves carried by the other shaft are old in the art. They are often referred to as Pot-type joints because of the pot-like appearance of the part in which the rollers and trunnions are contained.

Two types are in commercial use. One uses two diametrically opposed trunnions fixed to one shaft and is nonhomokinetic in operation at an angle. The other uses three equally spaced radial trunnions fixed to one shaft and is quasi-homokinetic when operating at an angle, i.e. the output rotation is orbital in nature and not pure rotation. Allowance must be made for this characteristic in any practical applications and for some the joint cannot be used.

Four trunnions can be readily accommodated within the circular cross-sectional area occupied by either of the above types of universal joints, thereby increasing torque capacity considerably with no diametral size penalty. This fact has long been recognized, and a sizeable collection of Prior Art exists featuring four trunnion pot-type joints with near-homokinetic torque transmission. The designs are based on the following concept:

The four trunnions and rollers on one shaft and their mating grooves on the other shaft are, in effect, divided into two universal joints of the two-trunnion type noted above. They are circumferentially spaced at right angles to each other, i.e. they are 90 degrees out of phase. Different means, which form the basis of each invention, are employed to connect either the trunnions or the grooves to the output shaft so as to permit the averaging of the nonhomokinetic rotations. The resulting rotation of the output shaft is still non-homokinetic, but of lesser magnitude than that of each two-trunnion joint taken separately.

Some illustrative examples follow:

Orain U.S. Pat. No. 3,975,922 uses torsionally resilient means to connect the two-trunnion joints to the output shaft. The resultant output rotation is an average of two non-homokinetic rotations 90 degrees out of phase.

Wildhaber U.S. Pat. No. 2,672,739 also uses resilient means, but in compression between the trunnions to act as an "equalizer".

Dunn U.S. Pat. No. 2,672,740 employs equalizing levers to achieve a similar result.

Wildhaber U.S. Pat. No. 2,670,614 shows a four bar linkage carrying the grooves.

As the art shows, the concept does not lend itself to a simple reliable design. No commercial applications are known.

A totally different concept, believed to be new in the art, is the basis of this invention. It does not unduly restrict design freedom in the choice of proven practical structure that is both compact and strong. Operationally, it ensures dynamic balance coupled with true homokinetic transmission of torque.

DISCLOSURE OF INVENTION

The invention is a Pot-type homokinetic universal joint.

A first joint half consists of four trunnion-mounted spherical rollers. The rollers are free to rotate about the trunnions, but are fixed axially so that the spherical center of each roller is maintained at a fixed radial distance from the first joint half axis of rotation.

The rollers are contained in grooved intermediate members carried by the second joint half. They are free to roll along the axial length of the grooves and oscillate transversely therein. Each groove extends in the axial direction of the second joint half and defines a radially and axially extending median plane.

The essence of the invention lies in the manner in which the intermediate members are allowed to move relative to each other and to the second joint half axis of rotation, while maintaining a torsionally rigid connection between the joint halves.

Specifically, the intermediate members are so connected to the second joint half that relative movement between them is possible but subject to the following conditions:

1. Mutual perpendicularity of the four median planes is continuously maintained.
2. The vertex line formed by the intersection of any two adjacent median planes can move radially toward or away from the second joint half axis of rotation while remaining always parallel therewith.
3. The other vertex line formed by the remaining two adjacent median planes can move in an identical mirror-image manner.
4. Both vertex lines are constrained to move in a bisector plane that continuously bisects the 90 degree vertex angle of the adjacent median planes.
5. The bisector plane passes through the axis of rotation of the second joint half.

The kinematic requirements outlined above ensure true homokinetic or constant velocity transmission of torque at any angle of operation. They are derived from a geometrical construction discovered by applicant which, to the best of his knowledge, has not been known or exploited in the Prior Art.

The invention fulfills these design objectives:

1. True homokinetic operation at all angles
2. Rotational dynamic balance
3. Low friction operation
4. Radially self-supporting
5. Axial displacement capability
6. Axial fixing capability
7. High torque capacity to diametral size ratio
8. Robust construction

BRIEF DESCRIPTION OF THE DRAWINGS

FIG. 1 is a sectional view in orthographic projection of an axially fixed version of the invention with axes at maximum angular inclination.

FIG. 2 is a sectional view indicated by arrows 2—2 shown in FIG. 1 with driveshaft removed.

FIG. 6 is a sectional view essentially of FIG. 4 except that the first axis of rotation is shown at maximum inclination. This axis and the four trunnion axes are indicated schematically by lines for reasons of clarity.

FIG. 7 illustrates the condition reached when the first axis of rotation has been rotated 45 degrees from the position shown in FIG. 6.

FIG. 8 is an orthographic projection showing the four intermediate members (see FIG. 5) in interlocked position.

FIG. 9 is an orthographic projection showing the four intermediate members in a maximum displaced position after the movements indicated by the arrows shown in FIG. 8.

FIG. 10 is a perspective view of one of the intermediate members (see FIG. 5) illustrating the median plane.

FIG. 11 is a perspective view of one of the intermediate members shown in FIGS. 1, 2 illustrating the median plane and the toroidal groove contour.

FIG. 12 is an orthographic projection of a different design of an intermediate member.

FIG. 13 is a perspective schematic diagram of the invention illustrating the pertinent geometric planes, lines, points and axes and their kinematic relationship.

FIGS. 14, 15, 16 are orthographic projections in the direction of arrow 81 shown in FIG. 13 with the axis 33 rotated to different angular positions.

FIGS. 17, 18, 19 are orthographic projections in the direction of arrow 83 shown in FIG. 13 showing the resultant rotations of axis 47.

BEST MODE FOR CARRYING OUT THE INVENTION

Foreword

Figures 3, 4:
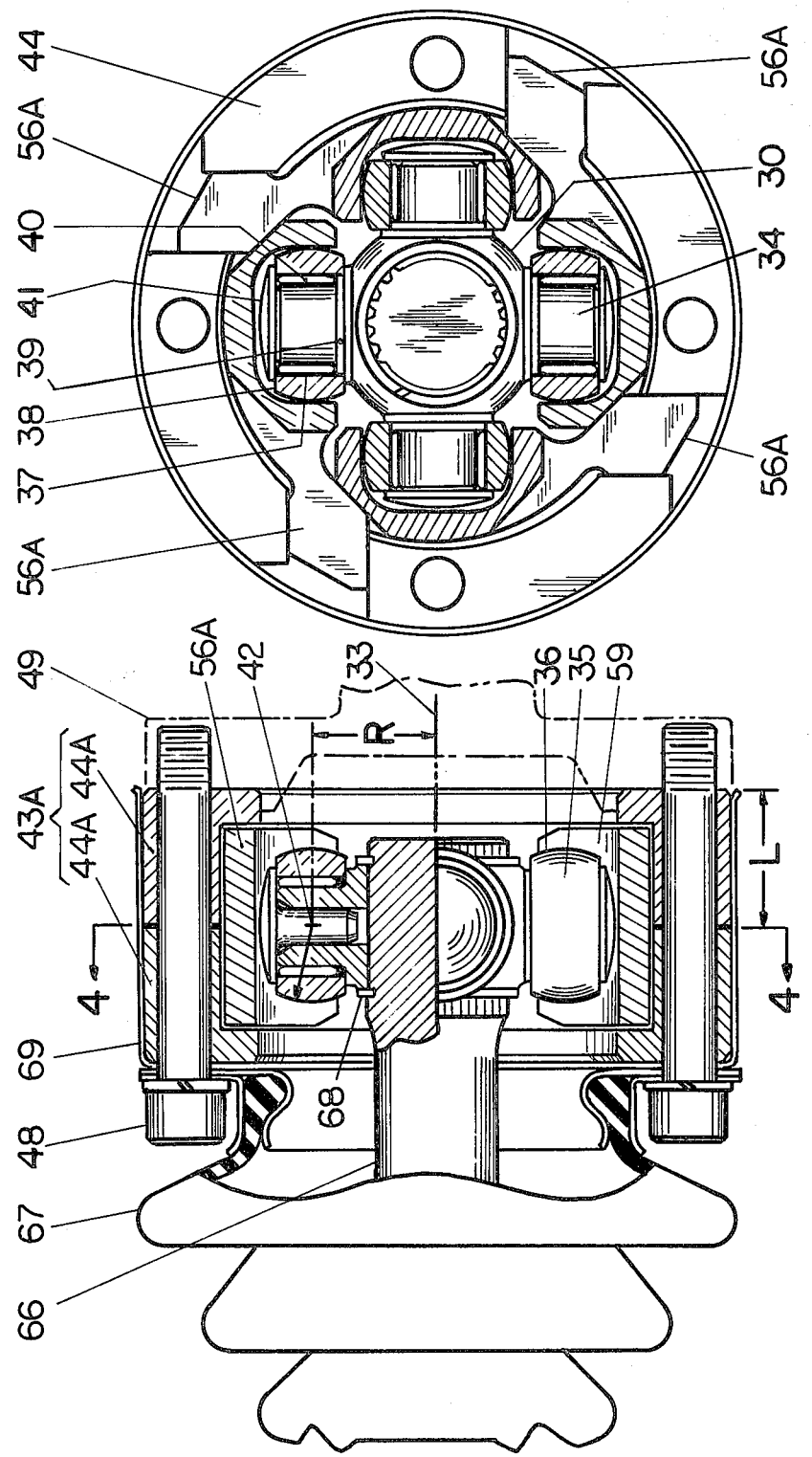
FIG. 3 is a sectional view in orthographic projection of an axially displaceable version of the invention with axes aligned.
FIG. 4 is a sectional view indicated by arrows 4—4 shown in FIG. 3.

In the description and claims to follow, reference will be made to geometric planes, axes, vertex lines, etc. These are not physical entities, but they are in all cases defined by the physical structure with which they are associated. They can be dimensionally determined with great precision by well known metrological methods. Abstractions such as these are indispensable frames of reference for manufacturing purposes and are universally considered to be part of structure. It is in this context that the description and claims be interpreted.

The term "self-supporting" is used and as applied to a universal joint means that no external means are required to maintain the two joint halves in proper operating relationship, i.e. the point of articulation is determined and maintained by the interaction of the internal torque transmitting members.

Two variations of the basic invention are illustrated in the drawings:

Embodiment A shown in FIGS. 3 through 10 is axially displaceable and self-supporting.

Embodiment B shown in FIGS. 1, 2, 11 is axially fixed and self-supporting. Embodiment A is basic and will be described in full detail. Embodiment B differs only that some structure is modified. The modified structure is identified in the drawings and description for both embodiments by labeling it with the same numeral followed by an A or B as applicable.

To avoid repetitious recitation of common structure, only the modified structure of Embodiment B will be described.

Finally, the geometric principle underlying the invention and its operation will be described with reference to FIGS. 13 through 19.

Description of Embodiment A

Figure 5:
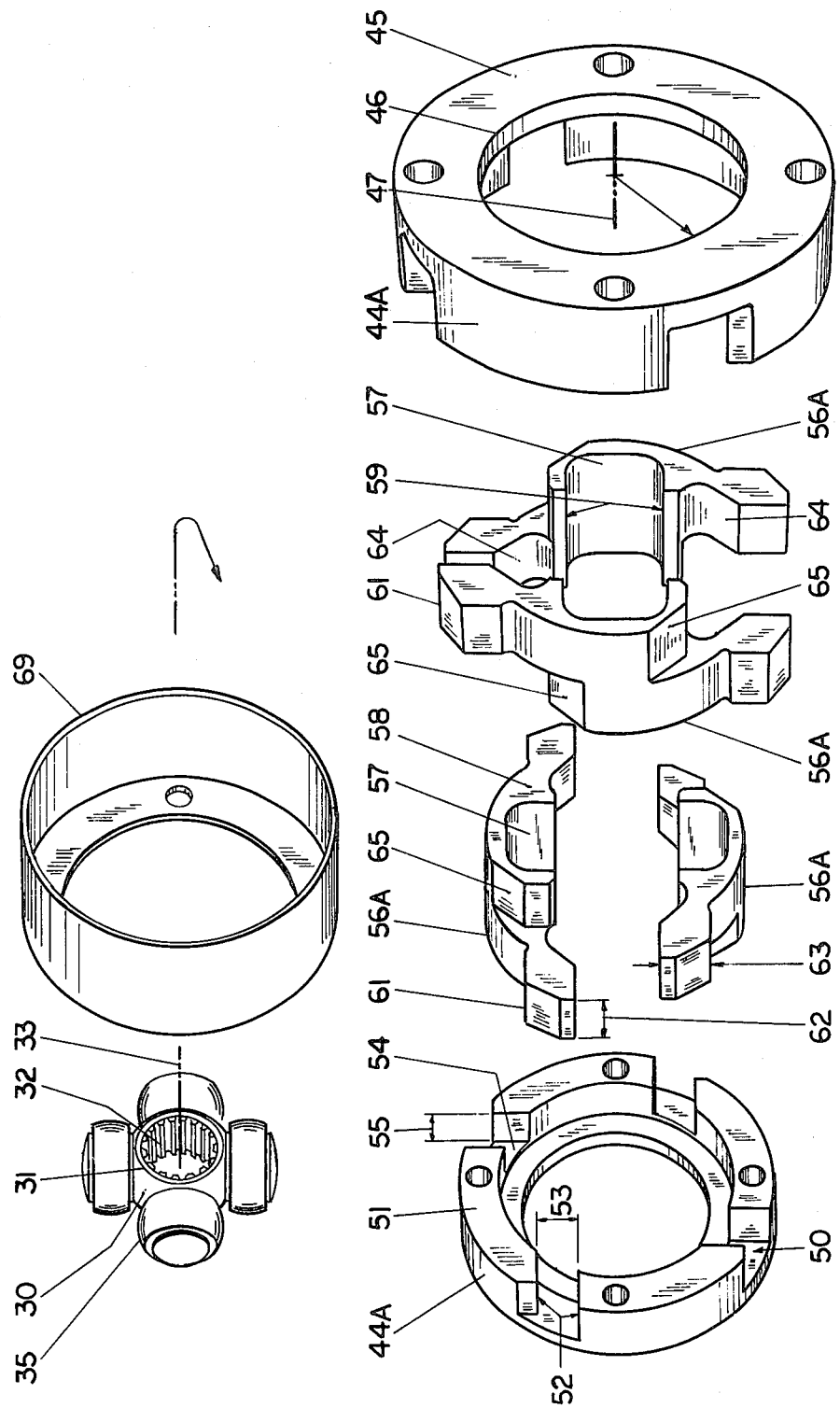
FIG. 5 is an exploded perspective view of the axially displaceable version of the invention showing only the pertinent parts.

First Joint Half 30—FIGS. 3, 4, 5

The first joint half 30 consists of a central hub 31 (FIG. 5) having a splined hole 32 which defines a first axis of rotation 33. Four coplanar, cylindrical trunnions 34 (FIG. 4) extend radially from the hub 31 and are equally spaced circumferentially. The first axis of rotation 33 is perpendicular to the plane containing the trunnion axes.

Rollers 35—FIGS. 3, 4

Four part spherical rollers 35 have an outer spherical surface 36 and a cylindrical bore 37 terminating at two parallel end faces 38. The rollers are mounted on trunnions 34 by means of washer 39, needle rollers 40 and end cap 41, which is pressed into a hole formed in each trunnion. The rollers are free to rotate about the trunnions but are fixed against any axial movement, so that the spherical center 42 (FIG. 3) of each roller is maintained at a radial distance R from the axis of rotation 33.

Second Joint Half 43A—FIGS. 3, 4, 5

The second joint half 43A consists of two ring-like members 44A (FIG. 5) placed end to end at assembly (FIG. 3). Each member 44A (FIG. 5) has a mounting face 45 and a pilot hole 46 which defines a centerline 47. This centerline becomes the axis of rotation for the second joint half when it is mounted by means of the pilot hole, mounting face and screws 48 to a rotatable power source 49 shown in dot-dash lines in FIG. 3. Four tangential keyways 50 (FIG. 5) are cut into end face 51. The keyways are equally spaced circumferentially and radially. Each keyway has two parallel faces 52 forming width 53 and a bottom face 54 at a depth 55 measured from end face 51.

Intermediate Member 56A—FIGS. 4, 5, 8, 9, 10

Intermediate member 56A (FIG. 5) has an axially extending groove 57 formed therein which terminates at two parallel end faces 58. The groove has parallel planar sides 59 which define a median plane 60 (FIG. 10). The sides are spaced apart a distance very slightly greater than the diameter of Roller 35. Two keys 61 of width 62 and depth 63 extend perpendicularly from the median plane 60, one on either side. They are staggered in the axial direction of the groove as best seen in FIG. 5. Depth 63 is a close slide fit in keyway width 53 in member 44A and width 62 is equal to or slightly less than depth 55 in member 44A. Two angled surfaces 64 and two angled surfaces 65 extend at 45 degrees to the median plane. Surfaces 64 contact surfaces 65 when the four intermediate members 56A are interlocked in the manner shown in FIGS. 8 and 9.

Assembly of Embodiment A—FIGS. 3, 4, 5, 8, 9

The rollers 35 are assembled to the first joint half 30 in the manner already described. Driveshaft 66 with boot 67 in position is inserted into splined hub 31 and secured axially with snap rings 68. This makes up a first joint half subassembly.

The four members 56A are interlocked as shown in FIGS. 8 and 9. The two rings 44A are placed in position over the interlocked assembly, mating the keys on the intermediate members with the keyways in rings 44A. Cover 69 is slipped over the rings, making up a second joint half subassembly.

The two subassemblies are lubricated and joined, the rollers entering the grooves in the intermediate members. Four screws 48 join the complete assembly to the power shaft 49. The result is a self-supporting axially displaceable homokinetic universal joint.

Operation of Embodiment A

FIGS. 8 and 9 show the interlocked arrangement of the four intermediate members 56A when assembled into the second joint half 43A which is not shown so that the mutual perpendicularity of the members is more clearly evident. The median planes 60 of any two adjacent grooves say G1 and G2 are perpendicular, intersect at a vertex line 70 and form a 90 degree vertex angle 71. The vertex line 70 is parallel to the second joint half axis of rotation 47. A bisector plane 72 bisects the vertex angle 71 and passes through the axis of rotation 47.

Assume that the member 56A carrying groove G1 is moved to the left as shown by the arrow. Then the adjacent member and groove G2 will move upward, groove G3 will move to the right and groove G4 downward. The result is shown in FIG. 9 which is at maximum displacement. Note that the two vertex lines 70 move in mirror-image synchronism in a radial direction from the axis of rotation 47 for a distance D and remain parallel to it. The vertex lines also move in and are confined to the bisector plane 72, which always passes through the second joint half axis of rotation 47. This action of the intermediate members meets the kinematic requirements listed under DISCLOSURE OF INVENTION, and occurs during joint operation at an angle as illustrated by FIGS. 6 and 7.

FIG. 6 is the same as FIG. 4 except that the first axis of rotation 33 is inclined at maximum angularity and shown schematically as a line as are the four trunnion axes. The position of the intermediate members 56A is the same as in FIG. 8. FIG. 7 shows the first axis of rotation rotated through an angle of 45 degrees. The position the intermediate members assume is that of FIG. 9. Note that the second joint half 43A has also rotated 45 degrees.

The kinematic requirements disclosed and taught by this invention can be met by the use of two intermediate members instead of four. FIG. 12 shows two intermediate members 73 symmetrically disposed about the second axis of rotation 47. Two grooves 57 are formed in each member so that their median planes 60 are perpendicular, meet in a vertex line 70 and form a vertex angle 71. Various means can be employed to connect the two intermediate members 73 to the second joint half so that the vertex lines 70 will move in mirror-image synchronism toward or away from the second axis of rotation and remain in the bisector plane 72 when the joint is operated at an angle. The scope of this invention is intended to encompass such means.

Description of Embodiment B

The description of Embodiment A applies. The following describes the modifications which differentiate the two.

Second Joint Half 43B—FIGS. 1, 2

The second joint half 43B like 43A consists of two rings 44B identical to 44A except the length L is shorter because it is not necessary to allow for axial displacement.

Intermediate Member 56B—FIGS. 1, 2, 11

Intermediate member 56B differs from 56A in that the distance between faces 58 is shorter and in that the groove sides 74 (FIG. 11) have toroidal surfaces 75 instead of planar. The location of the median plane 60 relative to the rest of the structure is identical to 56A. This plane 60 bisects a theoretical torus 76 through its centerline radius R which equals the radial distance R (FIG. 3) from the first axis of rotation 33 to the spherical center 42 of the roller 35. The cross-section diameter 77 of the torus 76 is equal to or slightly greater than the diameter of roller 35. The theoretical torus 76 is imagined to intersect the intermediate member 56B and displace material from the groove sides 74 to leave facing toroidal surfaces 75. Practical methods of producing such toroidal surfaces are well known.

Assembly of Embodiment B

The same procedure as for Embodiment A is followed.

Operation of Embodiment B

The description of the operation of Embodiment A also applies. Because of the interaction between the spherical rollers and the toroidal grooves in the intermediate members, the joint is fixed to articulate about fixed point P which lies in both axes of rotation. The result is a self-supporting axially fixed homokinetic universal joint.

OPERATING PRINCIPLE

Refer to FIG. 13. This is a perspective schematic diagram using the intermediate member design of FIG. 12 for clarity and better understanding of the kinematic principles used in the invention.

A plane 78 contains both the first axis of rotation 33 and the second axis of rotation 47. Three bearings for the axes are schematically shown fixed to the plane 78 and are labeled 79. The axes are inclined to each other at an angle A known as the true joint angle, and intersect at point P.

Four radial lines 80 representing the axes of trunnions 34 extend outwardly from the first axis of rotation 33, and terminate at points E, F, G, H which represent the spherical centers 42 of the spherical rollers 35.

Bisector plane 72 passes through the second axis of rotation 47 and is considered to be rigidly attached to it. The bisector plane bisects the vertex angle 71 of each set of two perpendicular planes 60, the vertex line 70 lying in the bisector plane. These two sets of planes 60 along with the bisector plane 72 correspond to those in FIG. 12. The vertex line 70 is considered to be movable toward and away from the second axis of rotation 47, always remaining in the bisector plane and always parallel to the axis of rotation 47.

The first axis of rotation 33 is shown in an arbitrary start position indicated by the angle B which is measured between the plane 78 and line 80 terminating at point E.

FIG. 14 is an orthographic projection in the direction of arrow 81 (FIG. 13) showing points E, F, G, H. The start position is indicated by arrow 82 and angle B.

FIG. 17 is an orthographic projection in the direction of arrow 83. The points E, F, G, H projected to lie on the viewing plane plot the ellipse 84. They are marked E', F', G', H'. If the bisector plane 72 and the median planes 60 are superimposed on the ellipse 84 as shown in FIG. 17, so that the bisector plane passes through point 47 and the median planes through points E', F', G', H' (bisector plane and median planes maintaining their spatial relationship), then the bisector plane will assume an angle J to line 78. This start position is indicated by arrow 85.

FIG. 15 shows axis 33 rotated 60 degrees counterclockwise from start position. Corresponding FIG. 18 shows the bisector plane 72 to have rotated 60 degrees counterclockwise from its start position.

FIG. 16 shows axis 33 rotated 105 degrees counterclockwise. Corresponding FIG. 19 shows bisector plane to have rotated 105 degrees counterclockwise from start position.

Note in FIGS. 17, 18, 19 the radial movement of the vertex lines 70, here labeled V1 and V2 for clarity. In a 180 degree revolution of the axes, vertex line V1 will, say, start at the center of axis 47, move away radially to a maximum D distance (FIGS. 7, 9), then move back to center and past it to the other maximum D distance and then back to center. Vertex line V2 will move similarly in mirror-image synchronism with vertex V1. Also note that the median planes 60 maintain their mutual perpendicularity during all phases of vertex line movement.

In view of the above, and since the bisector plane is rigidly attached to the second axis of rotation 47, it can be stated that any rotational movement of the first joint half axis of rotation 33 results in an exactly equal rotational movement of the second joint half axis of rotation 47. This homokinetic relationship between the axes of rotation can be further verified by rigorous mathematical analysis. An equation relating angles A and B, radius R and radial movement D is given under COMMENTS.

COMMENTS

The following are additional facts that contribute to a fuller understanding of the invention:

1. The equation relating angle of inclination A, angle of rotation B, roller radial offset R and vertex movement D is:

$$D \times \cos 45° = R \times \sin B \times \cos B \times (1 - \cos A)$$

2. D is maximum when B is a multiple of 45 degrees.
3. In one complete revolution of the axes, a vertex line V1 or V2 will move in the bisector plane a total linear distance equal to 8D.
4. Assuming the design proportions shown in FIG. 4, where R=0.9 inch, and where A max.=27 degrees, B=45 degrees, then D=0.069 max.
5. Each intermediate member moves tangentially to a maximum offset distance D1 equal to $D \times \cos 45°$. Using the above data D1 max.=0.050 inch.
6. For convenience, the second joint half is described as being connected to a power source. It is obvious that either joint half can be the driver.

The foregoing description has been very specific to best exemplify the essence of the invention. Other embodiments are possible using the disclosed principles.

Accordingly, the scope of this invention should not be determined by the embodiments, but by the appended claims and their legal equivalents.

What is claimed is:

1. A homokinetic universal joint comprising:
a first joint half, having a first axis of rotation;
four radially extending, coplanar, mutually perpendicular trunnions formed on the first joint half;
four spherical rollers rotatably mounted on the trunnions and fixed against axial movement thereon;
a second joint half, having a second axis of rotation;
four intermediate members, each member having an axially extending groove formed therein; each groove defining an axially and radially extending median plane;
the rollers contained in the grooves for rolling and oscillatory movement therein; and
means joining the four intermediate members to the second joint half so that the median planes are mutually perpendicular; any two adjacent median planes intersecting in a vertex, forming a first vertex line and a first vertex angle; the remaining two adjacent median planes forming a second vertex line and a second vertex angle; said means constraining the intermediate members to move relative to each other and to the second axis of rotation, while maintaining the mutual perpendicularity of the four median planes, when the joint rotates with the first axis of rotation angularly disposed to the second axis of rotation.

2. The homokinetic universal joint of claim 1 in which:
said means so restricts the relative movement of the intermediate members that the first vertex line and the second vertex line are constrained to move radially toward and away from the second axis of rotation while maintaining parallelism therewith; both vertex lines being confined to movement in a bisector plane that bisects the first vertex angle and the second vertex angle; the bisector plane passing through the second axis of rotation.

3. The homokinetic universal joint of claim 2 in which:
said means further restricts the radial movement of the first vertex line and the second vertex line to equal, synchronous, mirror-image movements toward and away from the second axis of rotation.

4. The homokinetic universal joint of claim 3 in which:
the groove in each intermediate member is formed with facing parallel planar surfaces symmetrically located about the median plane.

5. The homokinetic universal joint of claim 3 in which:
the groove in each intermediate member is formed with facing toroidal surfaces symmetrically located about the median plane.

6. The homokinetic universal joint of claim 5 in which:
the facing toroidal surfaces define a torus, the center of which lies in the groove median plane and on the second axis of rotation; the cross-sectional diameter of the torus being slightly greater than the diameter of a spherical roller.

7. A homokinetic universal joint comprising:
a first joint half, having a first axis of rotation;
four radially extending, coplanar, mutually perpendicular trunnions formed on the first joint half;
four spherical rollers rotatably mounted on the trunnions and fixed against axial movement thereon;
a second joint half, having a second axis of rotation;
two intermediate members, each member having two axially extending grooves formed therein; each groove defining an axially and radially extending median plane; the two median planes of each intermediate member being perpendicular to each other and intersecting in a vertex, forming a vertex line and a vertex angle;
the rollers contained in the grooves for rolling and oscillatory movement therein; and
means joining the two intermediate members to the second joint half so that the median planes are mutually perpendicular; said means constraining the intermediate members to move relative to each other in opposite directions and to the second axis of rotation, while maintaining the mutual perpendicularity of the four median planes, when the joint rotates with the first axis of rotation angularly disposed to the second axis of rotation.

8. The homokinetic universal joint of claim 7 in which:
said means so restricts the relative movement of the two intermediate members that the two vertex lines are constrained to move radially toward and away from the second axis of rotation while maintaining parallelism therewith; both vertex lines being confined to movement in a bisector plane that bisects both vertex angles; the bisector plane passing through the second axis of rotation.

9. The homokinetic universal joint of claim 8 in which:
said means further restricts the radial movement of the vertex lines to equal, synchronous, mirror-image movements toward and away from the second axis of rotation.

10. The homokinetic universal joint of claim 9 in which:
the two grooves in each intermediate member are formed with facing parallel planar sides symmetrically located about the associated median plane.

11. A homokinetic universal joint comprising:
a first joint half having a central hub defining a first axis of rotation;
four coplanar mutually perpendicular trunnions extending radially from the hub, each trunnion defining an axis of rotation;
four intermediate members; each member comprising two parallel end surfaces; a transverse groove formed in the member terminating at the end surfaces and defining a median plane perpendicular to both end surfaces; two keys of rectangular cross-section extending in line perpendicularly from the median plane, one on either side thereof, with each one adjacent to an end surface to form a staggered arrangement between the two end surfaces; four angular planar surfaces extending at 45 degrees from the median plane, two on each side thereof forming a set; one planar surface of a set being adjacent to one end surface, the other planar surface adjacent to the other end surface to form a staggered arrangement of two sets of angular planar surfaces between the end surfaces;
the four intermediate members being assembled with the angular planar surfaces in contact to form an interlocked square; the four median planes assuming a mutually perpendicular relationship; any two adjacent planes intersecting at a vertex line and forming a vertex angle;
a second joint half comprising two rings, each ring having an axis of rotation and two parallel end faces; four tangential keyways formed in one end face, the four keyways being equally spaced radially and circumferentially about the axis of rotation to form a swastika-like arrangement; each keyway a slide fit for a key on an intermediate member; the two rings assembled over the interlocked intermediate members, mating keys with keyways, making a second joint half subassembly having a second axis of rotation; and
four rollers rotatably mounted on the trunnions but fixed against axial movement thereon; each roller having a part spherical outer surface defining a spherical center which lies on the trunnion axis of rotation; the spherical outer surface of each roller being contained in and engaged with a groove in an intermediate member for rolling and oscillatory movement therein; when the joint is rotated with the first and second axes of rotation angularly disposed.

12. The homokinetic universal joint of claim 11 in which:
the groove in each intermediate member is formed with facing parallel planar surfaces symmetrically located about the median plane.

13. The homokinetic universal joint of claim 11 in which:
the groove in each intermediate member is formed with facing toroidal surfaces symmetrically located about the median plane.

14. The homokinetic universal joint of claim 13 in which:
the facing toroidal surfaces define a torus, the center of which lies in the groove median plane and on the second axis of rotation; the cross-sectional diameter of the torus being slightly greater than the diameter of a roller.

* * * * *